United States Patent
Ho et al.

(10) Patent No.: US 7,126,981 B2
(45) Date of Patent: Oct. 24, 2006

(54) METHOD AND APPARATUS FOR CELL SEARCH FOR W-CDMA WITH EFFECT OF CLOCK OFFSET

(75) Inventors: Jan Shin Ho, Ilan (TW); Wern Ho Sheen, Hsinchu (TW)

(73) Assignee: Accton Technology Corporation (TW)

( * ) Notice: Subject to any disclaimer, the term of this patent is extended or adjusted under 35 U.S.C. 154(b) by 866 days.

(21) Appl. No.: 10/131,413

(22) Filed: Apr. 25, 2002

(65) Prior Publication Data

US 2003/0202564 A1 Oct. 30, 2003

(51) Int. Cl.
*H04B 1/69* (2006.01)

(52) U.S. Cl. ....................................................... 375/147

(58) Field of Classification Search ................ 375/130, 375/149, 150, 141, 147, 142, 145; 370/322, 370/342, 441, 335
See application file for complete search history.

(56) References Cited

U.S. PATENT DOCUMENTS

| 6,038,250 | A | 3/2000 | Shou et al. | |
|---|---|---|---|---|
| 6,185,244 | B1 | 2/2001 | Nyström et al. | |
| 6,289,007 | B1 | 9/2001 | Kim et al. | |
| 6,487,193 | B1 * | 11/2002 | Hamada et al. | 370/342 |
| 6,674,790 | B1 * | 1/2004 | Rasmussen et al. | 375/146 |
| 6,744,832 | B1 * | 6/2004 | Miao | 375/349 |
| 6,785,321 | B1 * | 8/2004 | Yang et al. | 375/137 |
| 6,888,880 | B1 * | 5/2005 | Lee et al. | 375/149 |
| 2002/0037027 | A1 * | 3/2002 | Medlock et al. | 375/147 |
| 2002/0037028 | A1 * | 3/2002 | Baltersee et al. | 375/148 |
| 2003/0123408 | A1 * | 7/2003 | Saitou | 370/335 |
| 2005/0221848 | A1 * | 10/2005 | Chitrapu et al. | 455/502 |

* cited by examiner

Primary Examiner—Emmanuel Bayard

(57) ABSTRACT

The invention discloses a cell search method for a CDMA system for a three-stage cell search procedure. The cell search method have the steps of matching incoming signals; over-sampling the incoming signals N times against a chip rate; down-sampling the incoming signals and outputting N over-samples $(Y_1(k), Y_2(k), \cdots Y_N(k))$ to N parallel signal paths; choosing randomly a sample of the N over-samples; and transmitting the sample chosen randomly from the N over-samples into a first stage process, a second stage process and a third stage process to accomplish a trial. The invention significantly reduces the effect of clock offset so as to accomplish fast cell search.

28 Claims, 11 Drawing Sheets

(a) Observations on the Optimum Chip Timing (b) Observations of One Chip Neighbor to the Optimum Chip Timing

METHOD AND APPARATUS FOR CELL SEARCH FOR W-CDMA WITH EFFECT OF CLOCK OFFSET

BACKGROUND OF THE INVENTION

1. Field of the Invention

The present invention generally relates to a cell search method and apparatus for the code division multiple access (CDMA) system, and more particularly to a cell search method and apparatus for the wideband code division multiple access (W-CDMA) system to reduce the effect of clock offset.

2. Description of the Related Art

CDMA cellular systems based on code division multiple access (CDMA) using a direct sequence spread spectrum (DSSS) technology greatly increases the channel capacity. These systems are receiving much attention in the recent work on ground mobile communication systems. In general, bandwidth efficiency of a CDMA system is much better than that of other multiple access systems (FDMA, TDMA) because of the universal frequency reuse property. Moreover, the cell planning is also easy in these systems. Hence, a CDMA cellular system can be a promising system in the future.

Third generation partnership project (3GPP) wideband code division multiple access/frequency division duplex system (W-CDMA/FDD) has been adopted as one of the standards for the IMT-2000 third generation system. In CDMA cellular systems, the procedure used by a user equipment (UE) to search for the best cell is referred to as "cell search". Fast cell search is very important in order to reduce the UE switched-on delay (initial search), to increase standby time (idle mode search) and to maintain good link quality during handover (active mode search).

U.S. Pat. No. 6,038,250 issued to Shou et al., entitled "Initial Synchronization Method And Receiver for DS-CDMA Inter Base Station Asynchronous Cellular System", discloses that cells are searched at a high speed using an initial synchronization method and a receiver for a DS-CDMA inter base station asynchronous cellular system. A base band received signal is input to a matched filter and is correlated with a spread code supplied from a spread code generator. A signal electric power calculator calculates the electric power of the correlation output of the matched filter, and outputs the result to a long code synchronization timing determiner, a threshold value calculator, and a long code identifier. During the initial cell search, the spread code generator outputs a short code that is common to the control channel of each of the base stations. After the long code synchronization timing has been determined, each of the segments of the N chips which constituting a portion of the synthesized spread code sequence is sequentially replaced and output.

U.S. Pat. No. 6,185,244 issued to Nystrom et al., entitled "Cell searching in a CDMA communications system" discloses a coding scheme for more effectively acquiring a long code and frame timing during a cell search in a CDMA communications system. A code set of length M Q-ary code words including symbols from a set of Q short codes is defined with certain properties. The primary property to be satisfied is that no cyclic shift of a code word yields a valid code word. The other properties to be satisfied are that there is a one-to-one mapping between a long code message and a valid code word, and a decoder should be able to find both the random shift (thereby implicitly finding the frame timing) and the transmitted code word (i.e., its associated long code indication message) in the presence of interference and noise, with some degree of accuracy and reasonable complexity.

U.S. Pat. No. 6,289,007 issued to Kim et al., entitled "Method for Acquiring A Cell Site Station in Asynchronous CDMA Cellular Communication Systems", discloses that a group code and a cell code are multiplexed and then used as a pilot code for discriminating a base station in asynchronous cellular CDMA (Code Division Multiple Access) communication systems. Using the multiplexed code, interferences are reduced in case of using two pilot codes. A method for acquiring a cell site station in asynchronous CDMA (Code Division Multiple Access) communication systems including a base station controller, a plurality of mobile stations and base stations, and discriminating the base stations by using different sequences, the method including the steps of: a) assigning a group code of the cell as a pilot code of an inphase channel of the base stations; b) assigning a cell code of the cell as a pilot code of a quadrature channel of the base stations; and c) multiplexing the pilot codes of inphase channel and the quadrature channel, and generating an inphase/quadrature pilot code.

Now referring to FIG. 1, it will be helpful to understand the simplified frame structure of the 3GPP W-CDMA/FDD system. First, in 3GPP W-CDMA/FDD system, the cell search is typically carried out in three stages by employing two peculiarly designed synchronization channels and a common pilot channel. In the first stage 110, a primary synchronization channel (PSCH) 111 is used for slot synchronization. The primary synchronization channel (PSCH) 111 consists of a primary synchronization code which is denoted $ac_p$, where "a" ($=\pm 1$) depends on the existence of the transmit diversity at the base station (BS). In the second stage 120, the secondary synchronization channel (SSCH) 121 is used for frame/code group identification. The secondary synchronization channel (SSCH) 121 consists of the secondary synchronization code, which is denoted by $ac_s$, and the coefficient of $c_s$ is similar to that in PSCH. In the third stage 130, a common pilot channel (CPICH) 131 is used for determination of the downlink scrambling code. As shown, the 10-ms frame consists of 15 slots, and the system uses the chip rate of 3.84 Mchips/sec. Eventually, there are 38400 chips in a frame and 2560 chips in a slot. In addition, PSCH and SSCH are 256-chip long and only transmitted at the beginning of the slot boundaries.

Conventional cell search processes for the 3GPP W-CDMA/FDD system can be divided into two broad categories: the serial search and the pipeline search processes.

As shown in FIG. 2, the serial search process needs to go through all the three stages of synchronization one by one before a new three-stage attempt can commence: (1) slot synchronization, (2) frame synchronization/code group identification, (3) scrambling code identification. Now referring to FIG. 2, it is a simplified diagram for the conventional three-stage serial cell search processes. For convenience, a complete three-stage cell search procedure will be referred as a trial. Trials are not overlapped in the serial search, and trials are repeated again and again until the search succeeds. Namely, only one stage works at a time, e.g. only a block 211, a block 212 and a block 213 works at a time (here, a block means as a stage of a trial), which implies lower power consumption, but at the expense of a longer search time.

On the other hand, referring to FIG. 3, it is a simplified diagram for the conventional three-stage pipeline search processes. In the pipeline search processes, three stages are performed concurrently, which means the trials are overlapped. Namely, a block 311 a block 321 and a block 331 are in the same trial. Obviously, in the pipeline search processes, more trials are possible for a fixed amount of time, and hence result in a faster search. Of course, they require more power consuming. Note that no extra hardware is needed for the pipeline search processes, as compared with the serial search. For simplicity, we assume 10 (ms) is required for each stage, and then (K+2)×10 (ms) of the total processing time is necessary for a successful search which is terminated in the Kth trial.

However, a common assumption was usually made in the above prior art for the cell search, that is, the chip clock of the transmitter is known precisely to the receiver (namely, no clock offset), the frequency of incoming signal is assumed without frequency offset. In practice, the frequency offset is due to the source of frequency instability of the crystal oscillators of the user equipment, namely, the frequency of incoming signal will be with frequency offset for the user equipment. Frequency offset in baseband causes two effects (1) phase rotation (2) clock offset, wherein the effect of clock offset is not taken into account in past. The clock offset resulted from the frequency offset exists between the basestation and user equipment. The chip clock offset may make the error information and increase the cell search time. FIG. 4a and FIG. 4b are not prior arts, but the observations of clock drifts at the output of a primary code matched filter under the effect of clock offset by the inventors. As shown in FIG. 4a and FIG. 4b, the signal level degrades and the inter-chip interference increases significantly under the effect of chip clock offset.

SUMMARY OF THE INVENTION

The primary object of the present invention is to provide a cell search method for the CDMA system, especially for W-CDMA system, to reduce the effect of clock offset and to accomplish fast cell search.

Another object of the present invention is to provide a new cell search apparatus for the CDMA system, especially for W-CDMA system, to realize the cell search under the effect of chip clock offset without increasing the hardware complexity.

In order to achieve the above objects, the present invention provides a cell search method for the CDMA system, especially for W-CDMA system, to reduce the effect of clock offset by using a new cell search algorithms under the three-stage cell search procedure recommended by the 3GPP standard body. In the first stage, a PSCH is used for slot synchronization; in the second stage, a SSCH is used for frame/code group identification after slot synchronization; and in the third stage, a CPICH is used for the determination of the downlink scrambling code. The cell search method according to the present invention comprises the steps of: matching incoming signals; over-sampling the incoming signals N times against a chip rate; down-sampling the incoming signals and outputting N over-samples ($Y_1(k)$, $Y_2(k)$, $\cdots Y_N(k)$) to N parallel signal paths; choosing randomly a sample of the N over-samples; and transmitting the sample chosen randomly from the N over-samples into a first stage process, a second stage process and a third stage process to accomplish a trial.

The cell search method further comprising the steps of: achieving a slot synchronization of the incoming signal in the first stage process; achieving a code group and frame synchronization of the incoming signal in the second stage process; selecting a scrambling code of the incoming signal in the third stage process; testing the scrambling code against a threshold $\eta_0$ by a first verification; wherein if the threshold is not exceeded, then the trial is considered to be failure and a new trial will be restarted without penalty; or the selected scrambling code goes for a second verification unit; wherein if the scrambling code passes the second verification, then the trial is succeed, otherwise the a new trial will be restarted with a penalty time $T_P$ (ms) and; a initial sampling point at the matched filter output is assumed to be random.

One feature of the method according to the present invention is that the sample of the N over-samples ($Y_1(k)$, $Y_2(k)$, $\cdots Y_N(k)$) is chosen randomly to go through the three-stage search processes in each trial.

Another feature of the method according to the present invention is that the sample of the N over-samples ($Y_1(k)$, $Y_2(k)$, $\cdots Y_N(k)$) is chosen randomly and independently to be proceeded in each stage of each trial.

The present invention also provides a cell search apparatus for the CDMA system, especially for W-CDMA system, dealing with the three-stage cell search processes, wherein in the first stage, a PSCH is used for slot synchronization; in the second stage, a SSCH is used for frame/code group identification based on the slot boundary reported from the first stage; and in the third stage, a CPICH is used for determining the downlink scrambling code. The cell search apparatus according to the present invention comprises a chip matched filter, used for matching incoming signals; a sampling device connected to the chip matched filter, used for over-sampling the incoming signals by N times against a chip rate; a down-sample device connected to the sampling device, used for down-sampling the incoming signals and outputting N over-samples ($Y_1(k)$, $Y_2(k)$, $\cdots Y_N(k)$) to N parallel signal paths; an incoming signal selector connected to the down-sample device, used for choosing randomly one of the N over-samples; and to go through the succeeding stages; a first stage detector connected to the incoming signal selector, used for achieving slot synchronization; a second stage detector connected to the incoming signal selector, used for achieving frame boundary and code group synchronization; a third stage detector connected to the incoming signal selector, used for achieving the scrambling code; and a identification unit connected to the third stage detector, used for determining the trial succeed or not.

The identification unit further comprises: a comparator connected to the third stage detector, used for testing the output of the third stage detector against a threshold $\eta_0$; a first decision device connected to the comparator, used for determining the scrambling code; wherein if the threshold is exceeded, then the selected scrambling code goes for a synchronization verification unit, otherwise the trial is considered to be failure, and a new trial will be restarted without penalty; and the synchronization verification unit connected to the first decision device, used for verifying the scrambling code; and a second decision device connected to the synchronization verification unit, used for determining the acceptance of the scrambling code; wherein if the scrambling code passes the second decision device, then the trial is succeed, otherwise the a new trial will be restarted with a penalty time $T_P$ (ms) and; a initial sampling point at the matched filter is assumed uniformly distributed.

One feature of the apparatus according to the present invention is that one of the N over-samples ($Y_1(k)$, $Y_2(k)$, $\cdots Y_N(k)$) is chosen randomly to go through the three-stage search processes in each trial.

Another feature of the apparatus according to the present invention is that one of the N over-samples ($Y_1(k)$, $Y_2(k)$, ···$Y_N(k)$) is chosen randomly and independently to be proceeded in each stage of each trial.

Other objects, advantages, and novel features of the invention will become more apparent from the following detailed description when taken in conjunction with the accompanying drawing.

DESCRIPTION OF THE PREFERRED EMBODIMENT

The main idea of RSPT is that the N samples now are tested randomly on a trial-by-trial basis, one for each trial. The motivation is that random usages of available samples are advantageous under the presence of clock offset.

Figure 1:
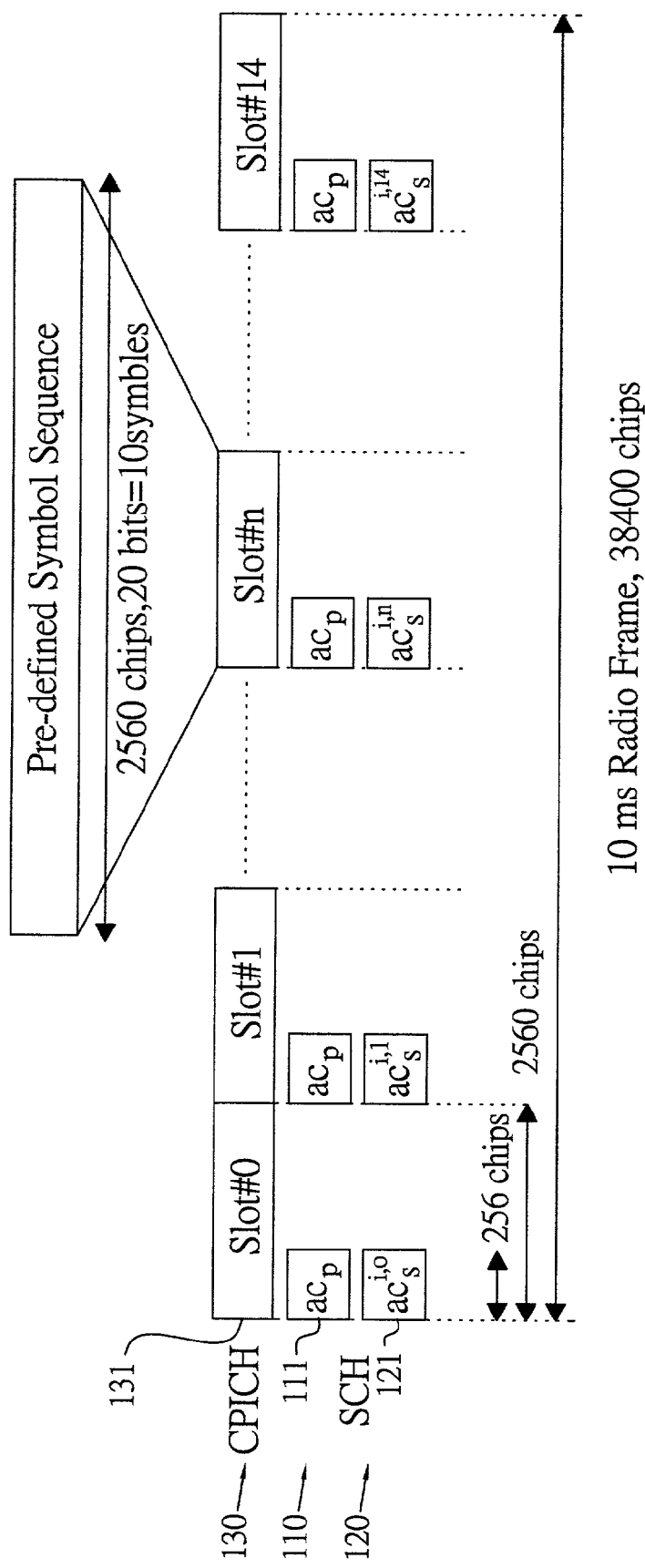
FIG. 1 shows a simplified frame structure for the 3GPP WCDMA/FDD system.
Figure 2:
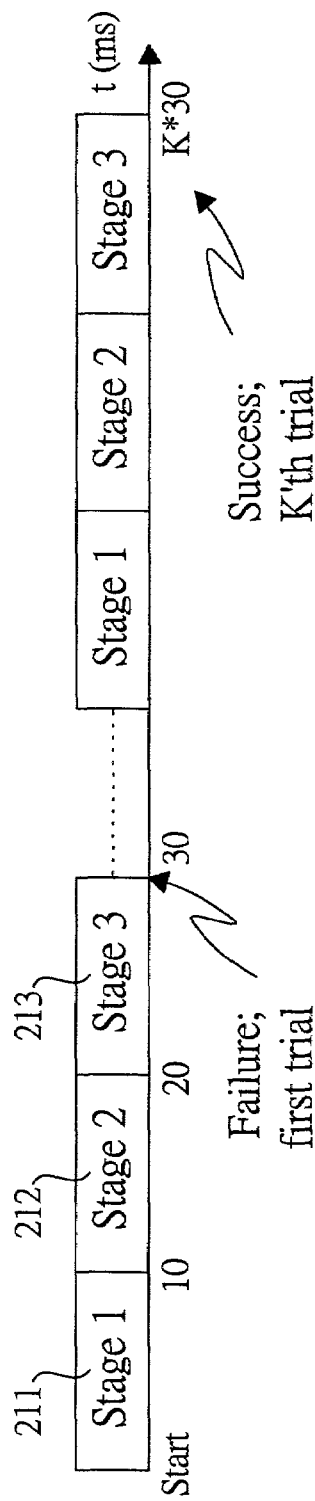
FIG. 2 shows a conventional serial cell search processes for the 3GPP WCDMA/FDD system. (10 (ms) processing time for each stage is assumed in this case.)
Figure 3:
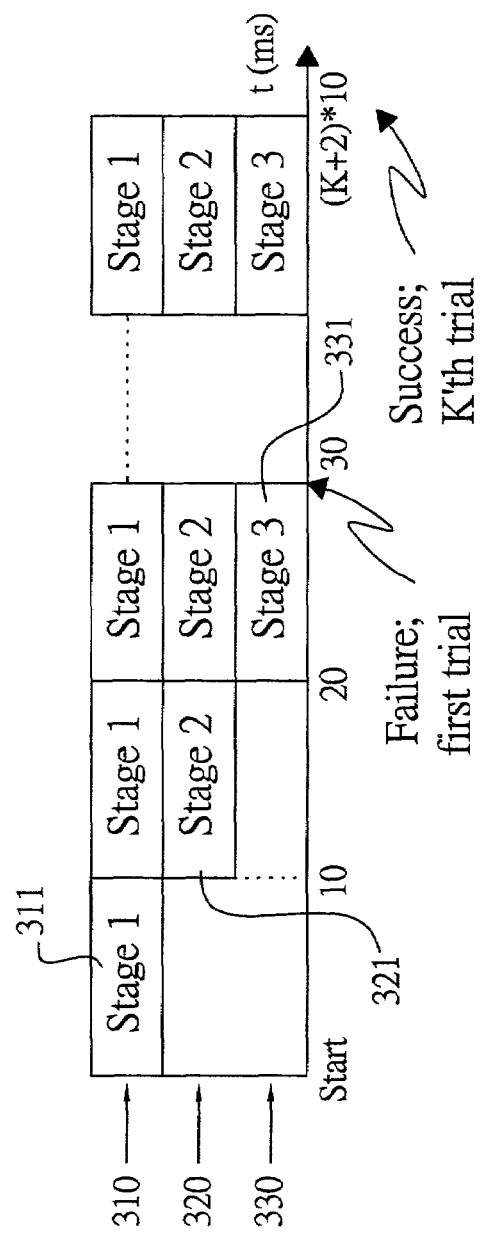
FIG. 3 shows a conventional pipeline cell search processes for the 3GPP WCDMA/FDD system. (10 (ms) processing time for each stage is assumed in this case.)
Figure 4A:
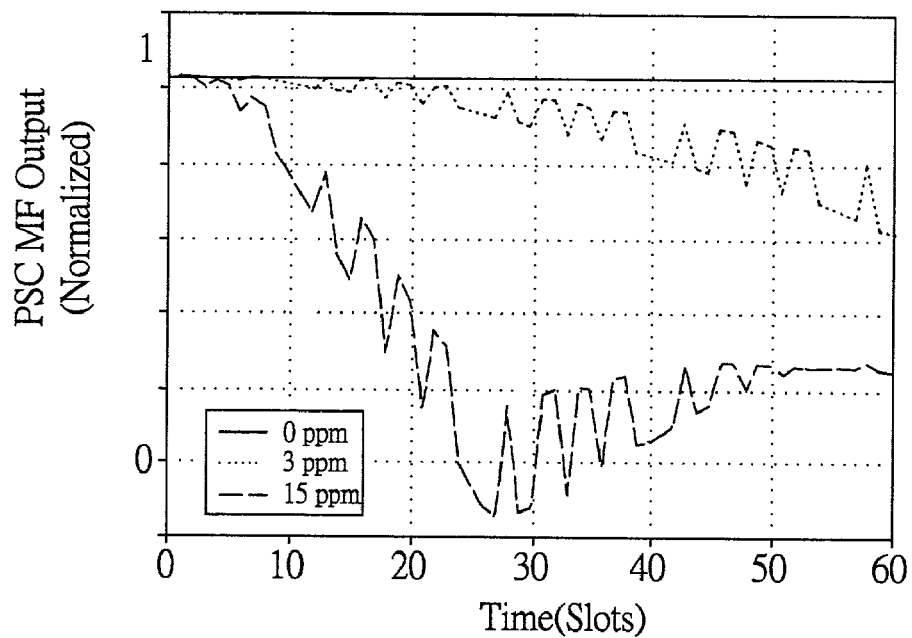
FIG. 4a and FIG. 4b show the signal level degradation and the inter-chip interference enhancement due to the effect of chip clock offset.
Figure 4B:
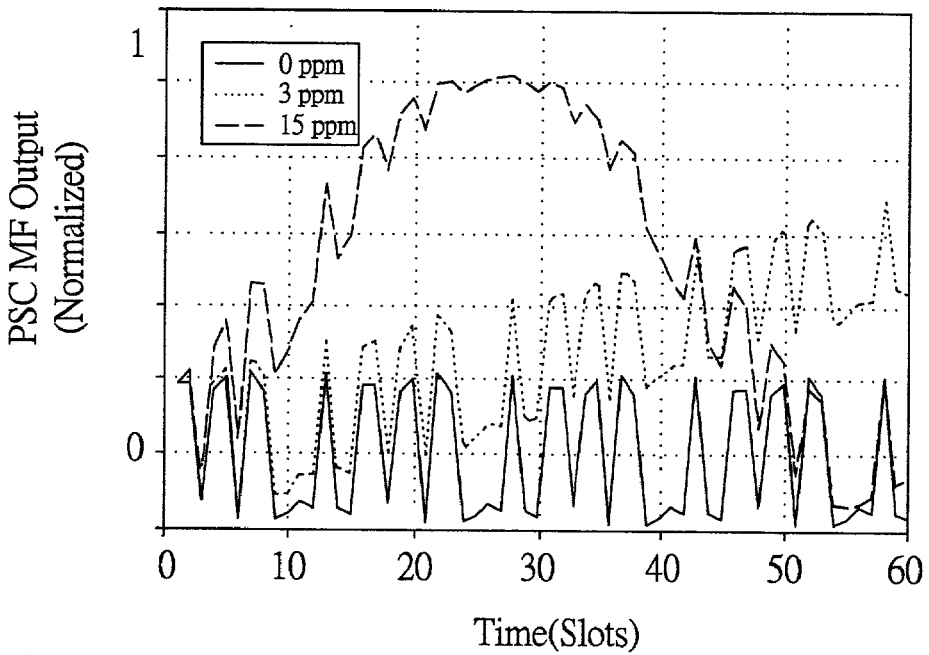
Figure 5:
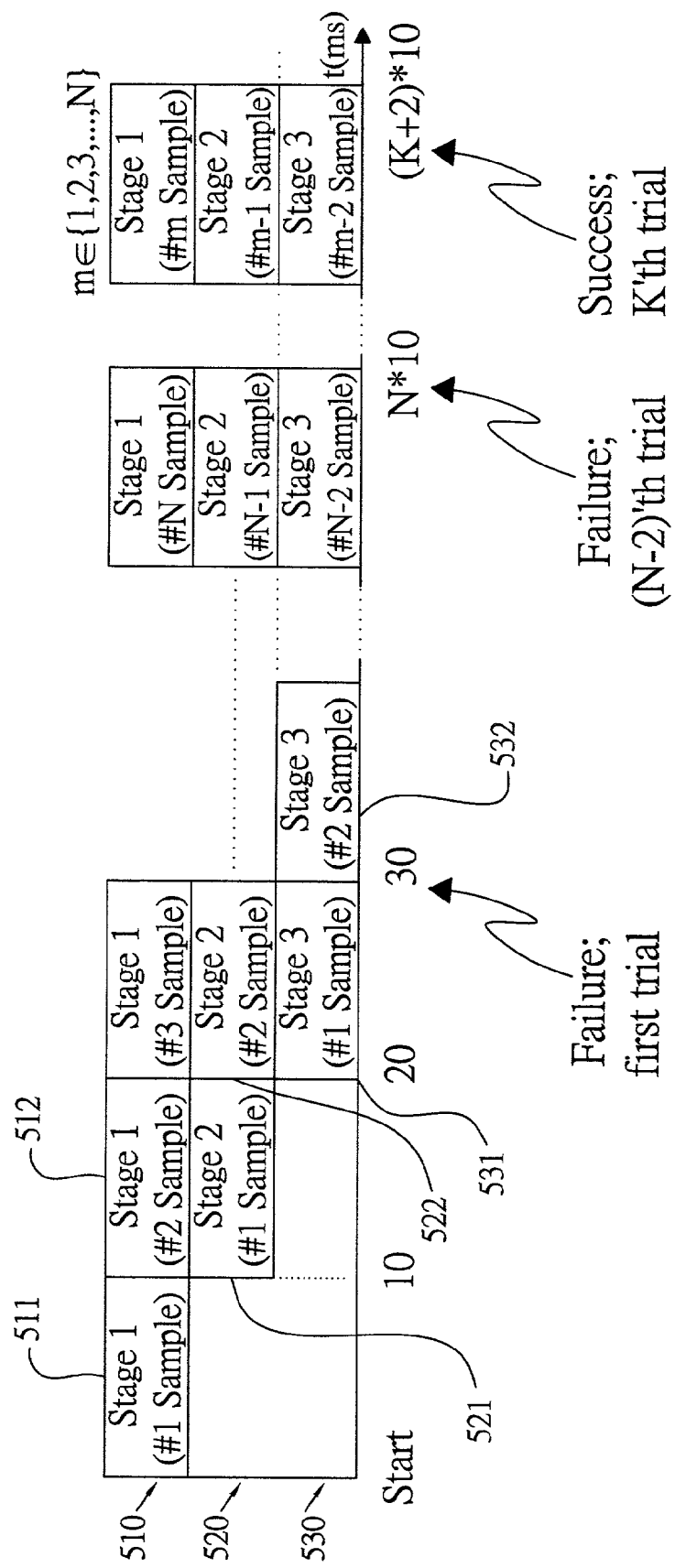
FIG. 5 shows a new cell search method using random sampling per trial (RSPT) method according to the first embodiment of the present invention.

Now referring to FIG. 5, it shows the operation of the RSPT method according to the first embodiment of the present invention. According to the present invention, 512 scrambling codes are used to differentiate different cells in the downlink and are reused all over the system. The codes are divided into 64 groups with 8 codes in each group. Each code is 38400-chip long and hence extends over a frame. Since the cell sites are not synchronized, the codes always begin their new period at the frame boundaries. As shown in FIG. 5, the method deals with three-stage processes. The first stage 510, having a PSCH, is used for slot synchronization. By using the same PSCH for each cell and by transmitting PSCH at the slot boundaries only, slot synchronization can be easily achieved by synchronization to PSCH. Furthermore, a generalized hierarchical Golay sequence is employed as the primary synchronization code (PSC) for easy implementation. The second stage 520, having a SSCH, is used for frame/code group identification after slot synchronization. Frame synchronization and code group identification can be achieved by detecting the secondary synchronization channel (SSCH), which is spread by one of the 16 orthogonal spreading codes, called the secondary synchronization codes (SSCs). The SSCs are orthogonal to PSC in order to reduce mutual interference. In addition, to facilitate fast frame/code group identification, the SSCH is further encoded into a set of 64 code words by using a (15,3) comma-free Reed Solomon code (CFRS), with each codeword in the set representing a code group. Because of the nice property of comma free, the frame synchronization is accomplished once the code group is identified. The third stage 530, having a CPICH, is used for the determination of the downlink scrambling code. After the code group is identified, the scrambling code can be determined easily by selecting one of the 8 codes in the group by using CPICH.

Figure 6:
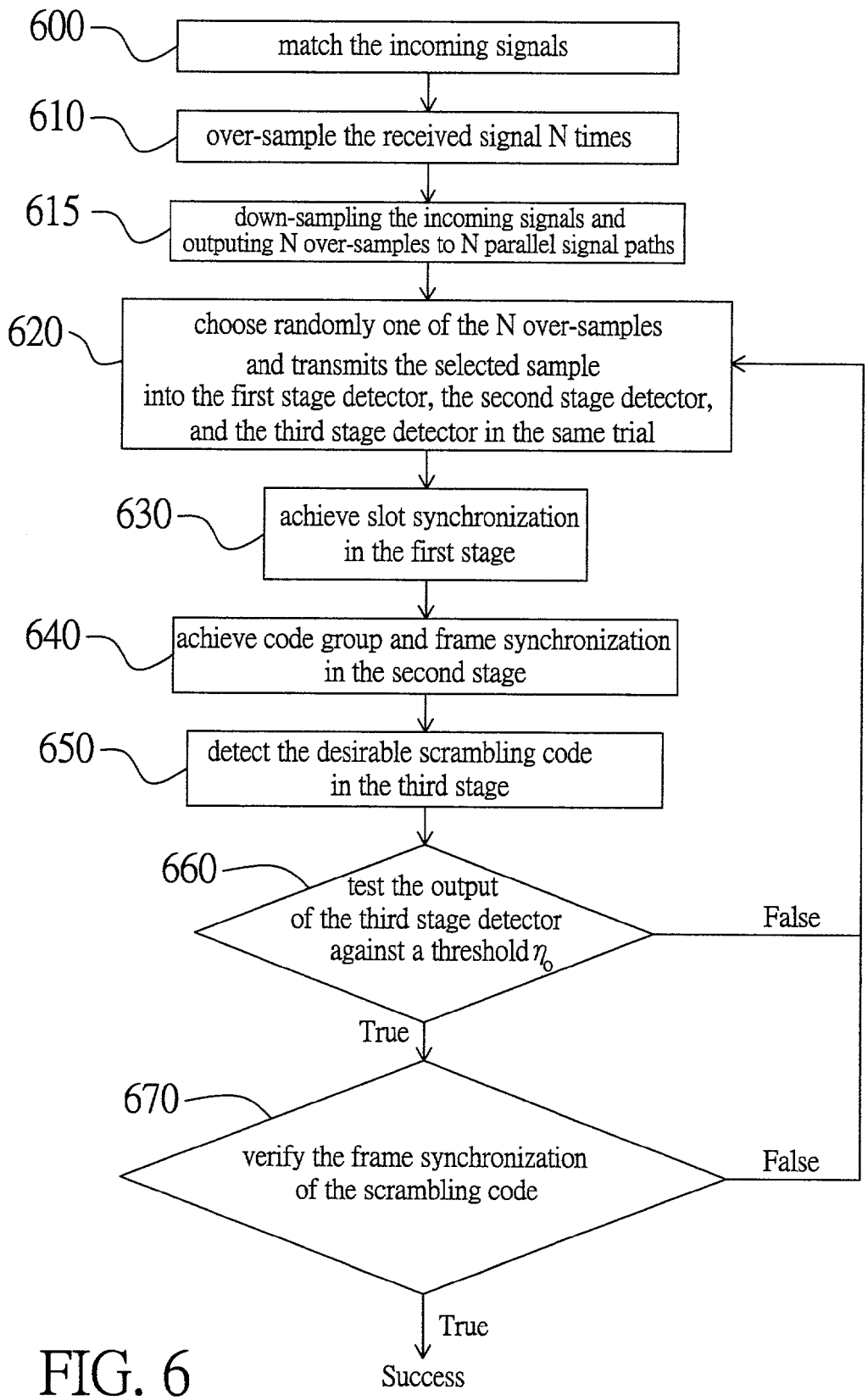
FIG. 6 shows a flowchart of the new cell search method using random sampling per trial (RSPT) method according to the first embodiment of the present invention.
Figure 9:
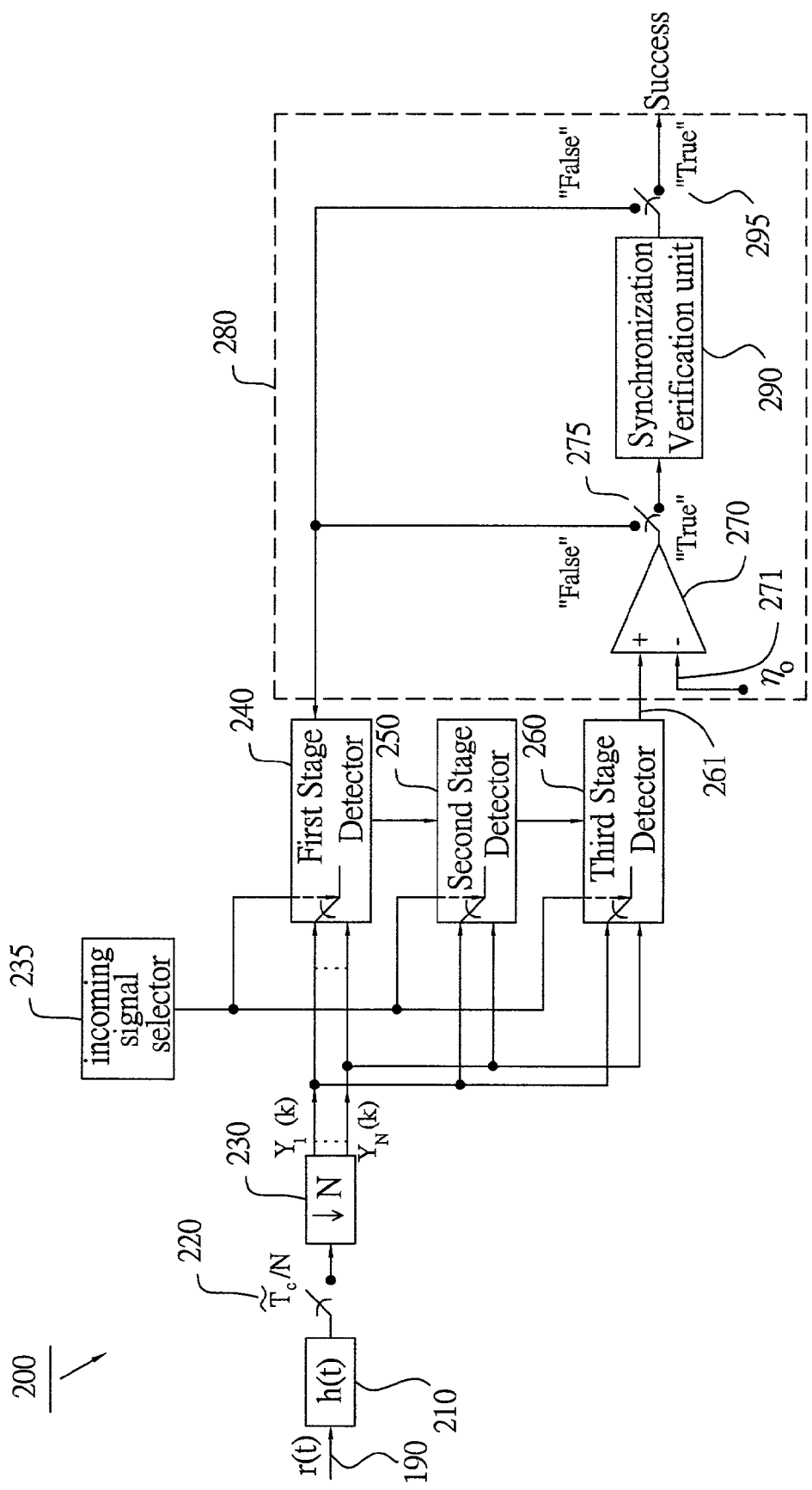
FIG. 9 is the architecture of the cell search system using random sampling per trial (RSPT), and random sampling per frame (RSPF) method according to the second embodiment of the present invention.

FIG. 6 shows a flowchart of the new cell search method using random sampling per trial (RSPT) method according to the first embodiment of the present invention. To describe the flowchart, FIG. 9 is also needed. FIG. 9 is the architecture of the cell search apparatus according to the present invention.

As shown in FIG. 9, the architecture is used to accommodate the random sampling per trial (RSPT) method. A cell search apparatus 200 for the CDMA system, especially for W-CDMA system, comprises a chip matched filter 210, a sampling device 220 connected to the matched filter 210, a down-sample device 230 connected to the sampling device 220, a incoming signal selector 235 connected to the down-sample device 230, a first stage detector 240 connected to the incoming signal selector 235, a second stage detector 250 connected to the incoming signal selector 235, a third stage detector 260 connected to the incoming signal selector 235, a identification unit 280 connected to the third stage detector 260. The identification unit 280 further comprises a comparator 270 connected to the third stage detector 260, a first decision device 275 connected to the comparator 270, a synchronization verification unit 290 connected to the first decision device 275, and a second decision device 295 connected to the synchronization verification unit 290.

Now referring to FIG. 6 and FIG. 9. In step 600, the matched filter 210 in front of the cell search apparatus 200 matches the incoming signals 190. In step 610, the sampling device 220 over-samples the received signal 190 N times against the chip rate and the N over-samples in each chip duration labeled by $Y_1(k), Y_2(k), \cdots Y_N(k)$ are fed into the down-sample device 230. In step 615, the down-sample device 230 down-samples the incoming signals and output N over-samples ($Y_1(k), Y_2(k), \cdots Y_N(k)$) to N parallel signal paths by a down sampler. In step 620, the incoming signal selector 235 chooses randomly one of the N over-samples and transmits the selected sample into the first stage detector 240, the second stage detector 250 and the third stage detector 260. It is noted that the testing is on a trial-by-trial basis, one for each trial, e.g., the block 511 at the first stage, the block 521 at the second stage and the block 531 at the third stage (in FIG. 5) test the same sampled point in which the sampled point is chosen randomly so as to reduce the adverse effect of chip clock offset. Once the trial fails, the next trial will be tested all over again by the random selected sample at hand. For example, in another new trial, the block 512 at the first stage, the block 522 at the second stage and the block 532 at the third stage test the same sample in which the sampled point is chosen randomly. The trial will still process unless the scrambling code is accepted by the synchronization verification processes. Furthermore, in order not to increase the hardware complexity, the randomly trial-by-trial selection among the N over-samples is serially carried out for each three-stage attempt, as the same with the conventional pipeline search processes. If we assume 10 (ms) is required for each stage, the cell search time of (K+2)×10(ms) is required in this method when the search is terminated in the Kth trial.

In step 630, the first stage detector 240 is used for slot synchronization. A non-coherent type matched filter, in which the matched filter is divided into several small segments and the outputs of each segment are combined with their absolute values, is partitioned into four (4) segments and used as the first stage detector 240 for slot synchronization in the first stage. The first stage detector uses a generalized hierarchical Golay sequence as a primary synchronization code (PSC) in a primary synchronization channel (PSCH). More than one slot boundary may be selected in the first stage to go through the next stages for a better performance.

In step 640, the code group and frame synchronization can be accomplished in the second stage, after slot synchronization. The second stage detector 250 uses sixteen (16) matched filters for the detection of the sixteen (16) SSCs. Coherent accumulation results from the channel estimation coming out from the first stage. After collecting fifteen (15) decisions, they are correlated with the sixty-four (64) CFRS code words, each with fifteen (15) possible cyclic shift positions. This results in 960 correlation values. And finally, the code group and cyclic shift position associated with the maximum value are identified as the desirable code group and frame boundary, respectively. In step 650, in the third stage, a scheme is employed to detect the desirable scrambling code out of the eight (8) codes according to the code group identified in the second stage. Basically, in the third stage, the third stage detector 260 selects a scrambling code in the third stage. The third stage detector 260 is actively correlated with eight (8) possible scrambling codes and votes for the possible candidate by selecting the maximum value out of the eight (8) codes once in a 256-chip (symbol) duration. Finally, after 150 symbols (one frame), the maximum ballot is transmitted to a identification unit 280 connected to the third stage detector 260 for determining the trial succeed or not. The maximum ballot is tested against the threshold $\eta_0$. The threshold is set up with the constant false alarm rate. In step 660, the output 261 of the third stage detector 260 is tested against a threshold $\eta_0$ 271 by the comparator 270. The first decision device 275 after the comparator 270 determines the scrambling code true or false. If the threshold is not exceeded, the trial is considered to be failure, and a new trial will be restarted without penalty. And, if the threshold is exceeded, then the selected scrambling code goes for the synchronization verification unit 290.

In step 670, the second decision device 295 after the synchronization verification unit 290 verifies the selected scrambling code, wherein if the scrambling code passes the second decision device 295, then the trial is succeed, otherwise the a new trial will be restarted with a penalty time $T_P$ (ms) and; a initial sampling point at the matched filter is assumed uniformly distributed. We assume that the false alarm in the verification unit processes is negligible. Thus, the penalty time paid for the false alarm in the second decision device 295 is $T_P$ (ms).

Figure 7:
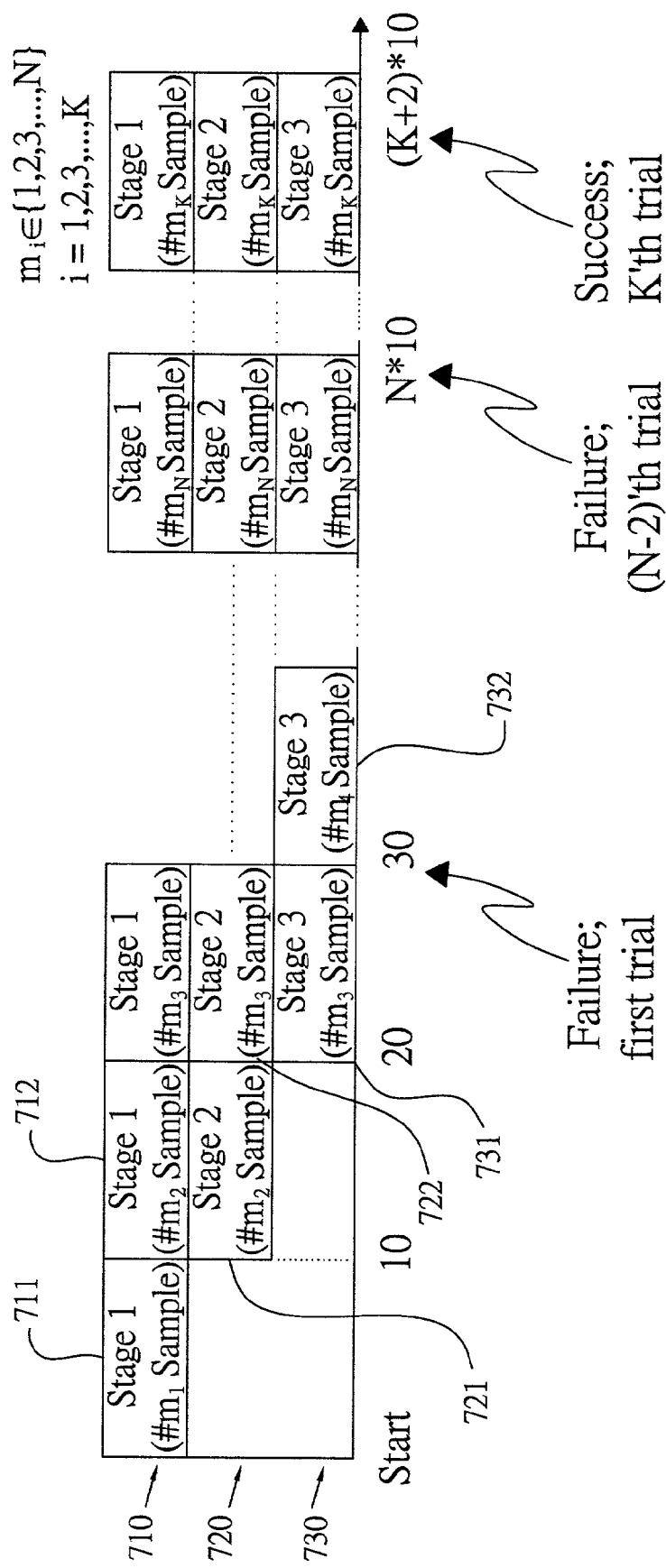
FIG. 7 shows a new cell search method using random sampling per frame (RSPF) method according to the embodiment of the present invention.

Referring to FIG. 7, it illustrates the operation of the RSPF method according to another embodiment of the present invention. The procedure of the operation of the RSPF method is very similar to the operation of the RSPT method. However, the idea of random sampling is applied in a frame-by frame basis in the RSPF method instead of a trial-by-trial basis in the RSPT method.

Figure 8:
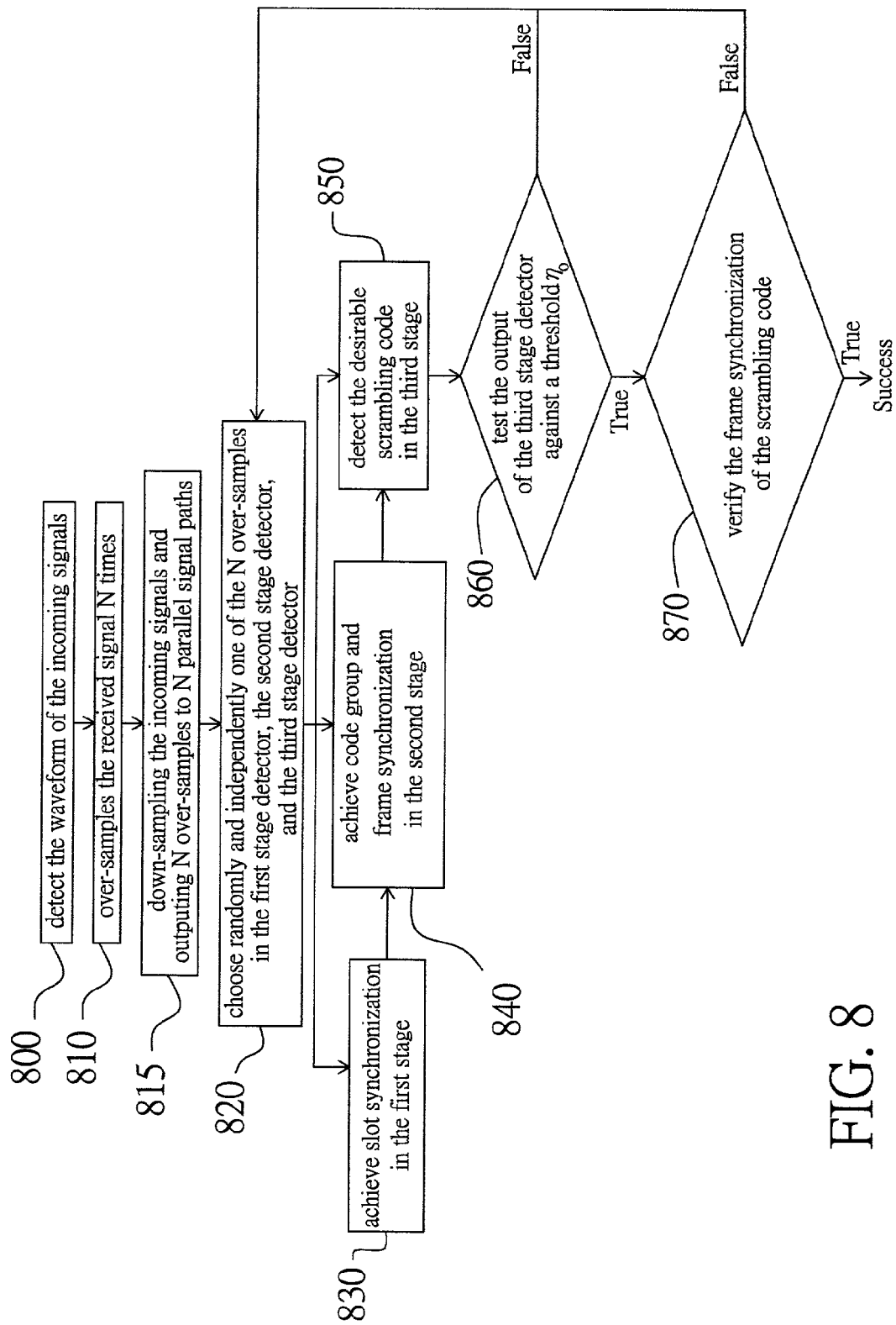
FIG. 8 shows a flowchart of the new cell search method using random sampling per frame (RSPF) method according to the second embodiment of the present invention.

FIG. 8 depicts a flowchart of the new cell search method using random sampling per frame (RSPF) method according to the second embodiment of the present invention. Now referring to FIG. 8 and FIG. 9. In step 820, the incoming signal selector 235 chooses randomly one of the N over-samples and transmits the one of the N over-samples into a first stage detector 240, a second stage detector 250 and a third stage detector 260. It is noted that the testing is on a frame-by-frame basis without loss of the generality. The samples tested in the first stage detector 240, the second stage detector 250 and the third stage detector 260 may be the same or may be different, namely, they are random and independent. It will be explained how the RSPF method can work by means of its first trial. As shown in FIG. 7, in the first trial of the RSPF method cell searcher, the block 711 at the first stage, the block 721 at the second stage 721 and the block 731 at the third stage detect an sample chosen independently and randomly from N over-samples $Y_1(k)$, $Y_2(k)$, $\cdots Y_N(k)$. The sample is chosen randomly frame-by-frame so as to reduce the adverse effect of clock offset among the frames. Once the trial fails, the next trial will be tested all over again by the random selected sample at hand. For example, in another new trial, the block 712 at the first stage, the block 722 at the second stage and the block 732 at the third stage independently test a sample in which the sampled point is chosen randomly. The trial will still process unless the scrambling code is accepted by the synchronization verification processes.

Extensive computer simulations are used to evaluate the performance of new cell search algorithms comparing to the traditional method. The emphasis will be on the effect of clock offset. The simulation results are under the conditions: over-samplers N=2, the maximum Doppler shift is 185.2 Hz (100-km/hr), the processing time for each stage detection is 10 (ms), $T_P$=250 (ms) and $\eta_0$ is set with a false alarm of $10^{-5}$. In addition, the transmit powers of the physical channels are distributed as follows. First, PSCH and SSCH have the same power, and the power ratio of CPICH and SCH (PSCH+SSCH) is unity. Second, the power of CPICH is 10% to the total transmit power. In other words, during cell search, 80% of the transmit power is contributed to the intra-cell interference. And finally, a geometry factor G=(P₁+Ppsc+Pssc+Ppc)/Pxis used to model the location of UE in a cell. The higher the G, the closer the UE from the desired base station. Cumulative distribution function (CDF) of search time is the performance index used for evaluating different search algorithms.

Figure 10:
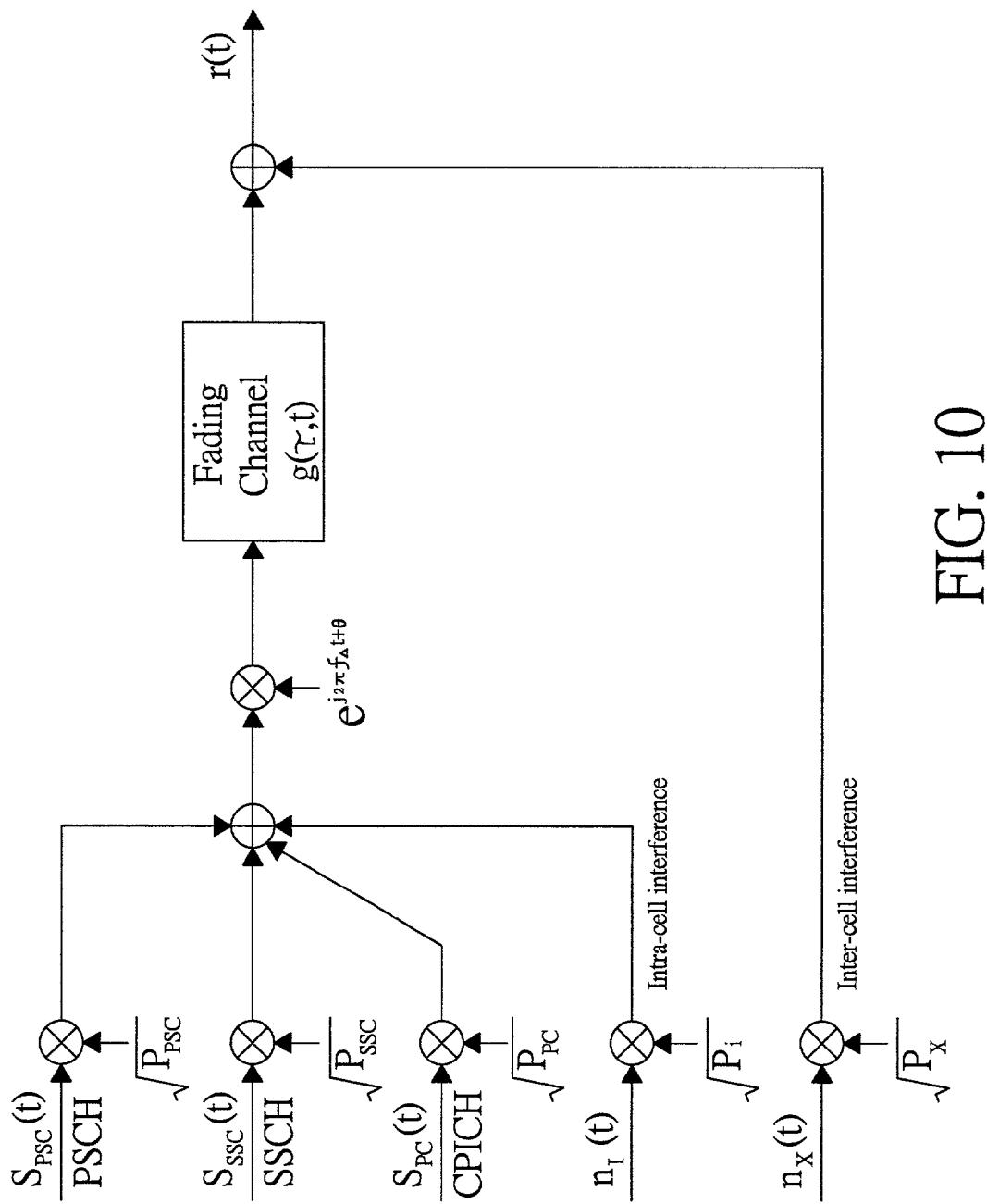
FIG. 10 shows a signal model used in the present invention.

Referring to FIG. 10, it depicts a signal model used in the present invention with the effect of chip clock offset. Using a base-band representation, the received signal r(t) is given by $$r(t) = \sum_{i=-\infty}^{\infty} \{[\sqrt{P_{psc}}\, c_{psc}(i) + \sqrt{P_{ssc}}\, c_{ssc}(i) + \sqrt{P_{pc}}\, c_{pc}(i)]h(t-i(1+\xi)\tilde{T}_c - \tau) + \sqrt{P_1}\, n_1(t)\}g(t)e^{j2\pi f_n t} + \sqrt{P_x}\, n_x(t)$$

where $P_{psc}$, $C_{psc}$, $P_{ssc}$, $C_{ssc}$ and $P_{pc}$, $C_{pc}$ are the power and spreading codes of the PSCH, SSCH and CPICH, respectively, g(t) is the complex-valued Rayleigh fading gain, h(t) is a square root raised cosine shaping function with roll-off factor 0.22, $\tilde{T}_c$ is the chip duration of the user equipment (UE). $\tau$ is the initial random delay and is modeled as a random variable with uniform distribution over (−0.5 Tc, 0.5 Tc], $T_c$ is the chip duration of the base station, $f_c$ is the carrier frequency of the BS, $f\Delta$ is the frequency offset between the UE and the target BS, and $\xi = f_{66}/f_c$. In addition, $P_I$ and $P_X$ are the power of the intra-cell interference $n_I(t)$ and inter-cell interference $n_X(t)$, respectively, where $n_I(t)$ and $n_X(t)$ are modeled as zero mean additive white Gaussian noise with unity variance. Three observations on the modeling of above are worthy mentioning here. First, for simplicity, only flat fading channels are considered, and only the channels relevant to the cell search are treated explicitly; all other channels are included either in the interference terms $n_I(t)$ or $n_X(t)$. Second, $\xi$ denotes the effect of clock offset, which have been neglected in prior art. Third, it is assumed that the effect of clock offset are due to propagation delay uncertainly and phase rotation and clock offset resulted from the same source of frequency instability of oscillators.

Figure 11:
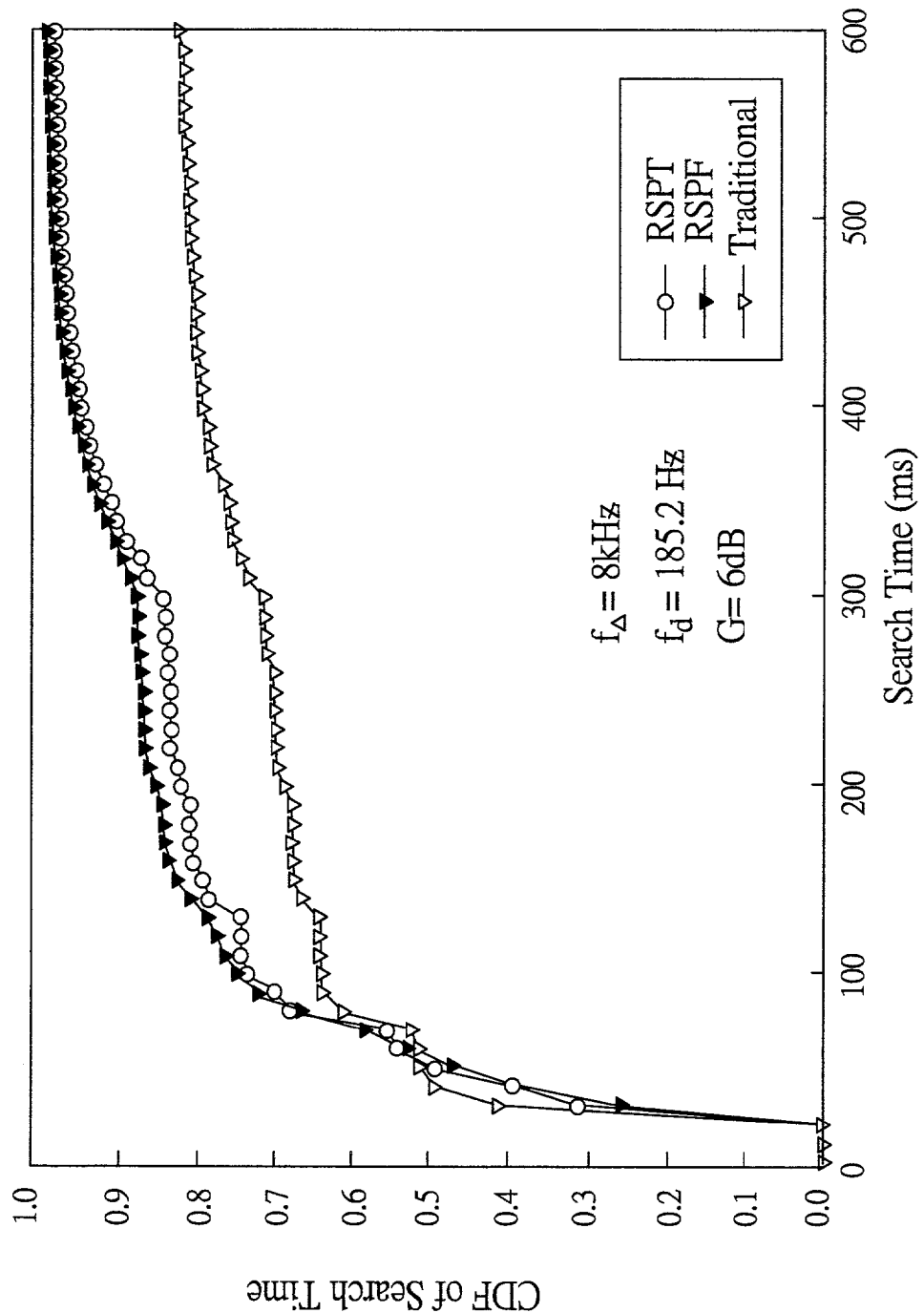
FIG. 11 shows the search performance of the different cell search method with the effect of clock offset with $f_\Delta=8$ kHz.
Figure 12:
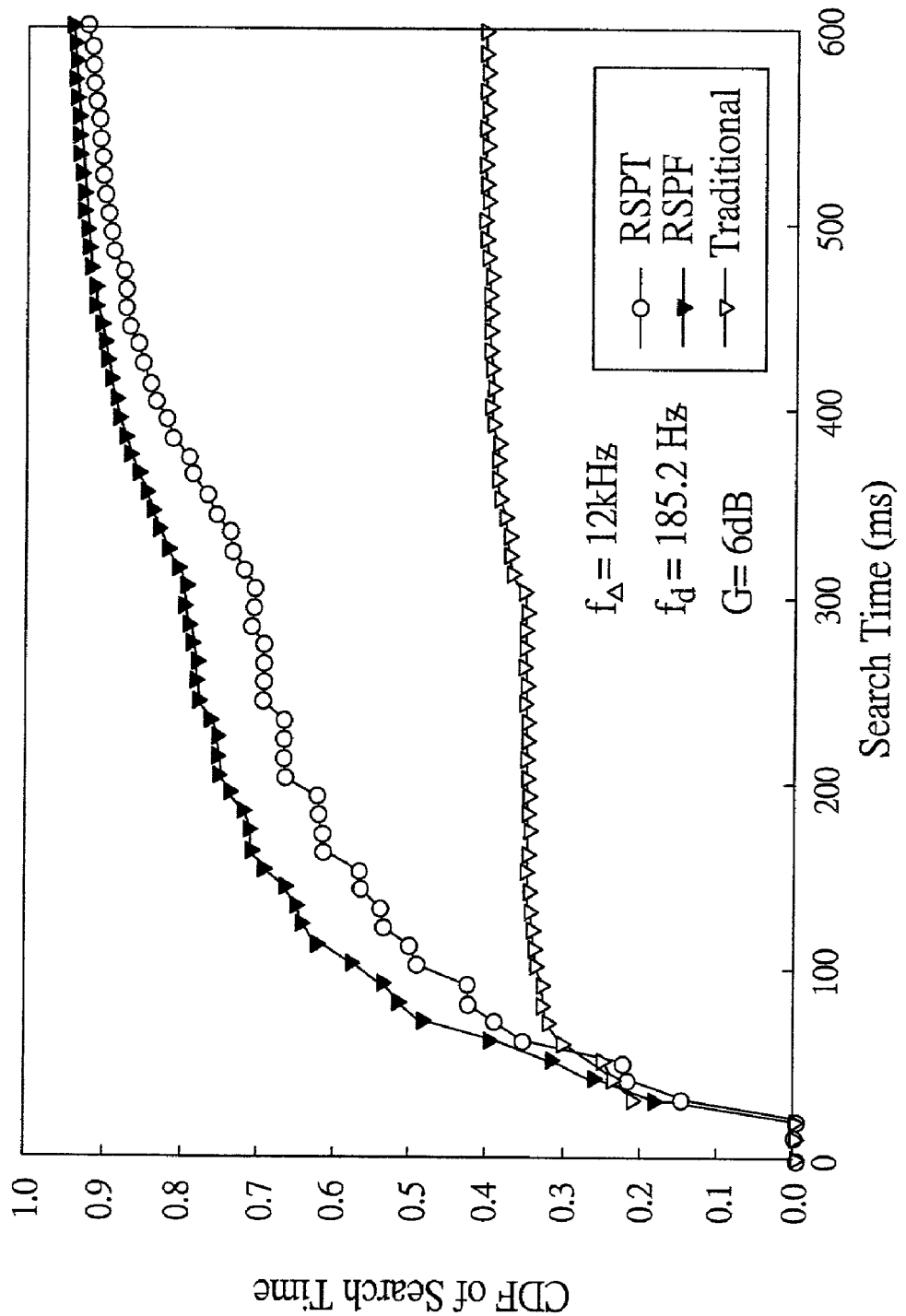
FIG. 12 shows the search performance of the different cell search method with the effect of clock offset with $f_\Delta=12$ kHz.

FIG. 11 shows the search performance of the different cell search method with the effect of clock offset with a frequency offset $f_\Delta$=8 kHz. In this case, the chip timing drifts almost half chip during a trial. A trial will never succeed, if the chip timing drifts more than a chip before the end of the three stages. As shown, RSPT method and RSPF method significantly outperform the traditional algorithm, since the adverse effect of clock offset is not properly handled. This is attributed to that under presence of clock offset, random sampling has a better chance to have reasonable good samples for all the three stages. In FIG. 12, the search performance of the different cell search method with the effect of clock offset with the frequency offset $f_{66}$ =12 kHz is demonstrated for reference. The performance gap between the traditional method and RSPT method, RSPF method becomes wider. From FIG. 11 and FIG. 12, it shows that RSPF method according to the second embodiment of the present invention is the best choice under the frequency-offset environments.

Accordingly, the cell search method for the CDMA system of the present invention significantly reduces the effect of clock offset in the CDMA system so as to accomplish fast cell search. The cell search apparatus for the CDMA system of the present invention can realize the cell search under the effect of clock offset without increasing the hardware complexity. It should be appreciated that the method and apparatus according to the present invention can also be applied to the mobile equipment and wireless PDA system.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. A cell search method for a CDMA system for a three-stage cell search procedure, comprising the steps of:
    matching incoming signals;
    over-sampling the incoming signals N times against a chip rate;
    down-sampling the incoming signals and outputting N over-samples $(Y_1(k), Y_2(k), Y_N(k))$ to N parallel signal paths;
    choosing randomly a sample of the N over-samples;
    transmitting the sample chosen randomly from the N over-samples into a first stage process,
    a second stage process and a third stage process to accomplish a trial;
    achieving a slot synchronization of the incoming signal in the first stage process;
    achieving a code group and frame synchronization of the incoming signal in the second stage process;
    selecting a scrambling code of the incoming signal in the third stage process; and
    testing the scrambling code against a threshold $\eta_0$ by a first verification;
    wherein if the threshold is not exceeded, then the trial is considered to be failure and a new trial will be restarted without penalty; or
    the selected scrambling code goes for a second verification unit;
    wherein if the scrambling code passes the second verification, then the trial succeeds, otherwise the a new trial will be restarted with a penalty time $T_P$ (ms) and an initial sampling point at a matched filter output is assumed to be random.

2. A cell search method as claimed in claim 1, wherein the sample of the N over-samples $(Y_1(K), Y_2(K), Y_N(K))$ is chosen randomly to go through the three-stage search processes in each trial.

3. A cell search method as claimed in claim 1, wherein the sample of the N over-samples $(Y_1(k), Y_2(k), Y_N(k))$ is chosen randomly and independently to be proceeded in each stage of each trial.

4. A cell search method as claimed in claim 1, wherein achieving the slot synchronization further comprises the step of:
    using a generalized hierarchical Golay sequence as a primary synchronization code (PSC) in a primary synchronization channel (PSCH).

5. A cell search method as claimed in claim 1, wherein achieving a code group and frame synchronization further comprises the step of:
    a second stage detector using 16 secondary synchronization codes (SSCs) orthogonal to the PSC in a secondary synchronization channel (SSCH).

6. A cell search method as claimed in claim 5, wherein the secondary synchronization channel (SSCH) is further encoded into a set of 64 code words by using a (15,3) comma-freed Reed Solomon code (CFRS), with each code word in the set representing a code group, to identify a frame boundary and code group.

7. A cell search method as claimed in claim 1, wherein the scrambling code is determined by selecting one of the 8 codes by in a common pilot channel (CPICH) after the code group and frame boundary is identified.

8. A cell search method as claimed in claim 1, wherein a first stage detector uses a non-coherent combined matched filter for slot synchronization in the first stage.

9. A cell search method as claimed in claim 4, wherein a first stage detector selects more than one slot boundary candidate of the primary synchronization code (PSC) for the slot synchronization, although only one candidate will be considered.

10. A cell search method as claimed in claim 5, wherein the second stage detector uses 16 matched filters for the detection of the secondary synchronization codes (SSCs) for the code group and frame synchronization.

11. A cell search method as claimed in claim 7, wherein the code group and frame boundary use the code group and cyclic shift position associated with a maximum value of correlation values resulted from the code words in the second stage, respectively.

12. A cell search method as claimed in claim 1, wherein the threshold $\eta_0$ is preset according to a constant false alarm rate.

13. A cell search method as claimed in claim 1, wherein the cell search method is used for wideband code division multiple access, frequency division duplex system (W-CDMA/FDD).

14. A cell search method as claimed in claim 1, wherein the cell search method is used for the mobile equipment and wireless PDA system.

15. A cell search apparatus for a CDMA system for a three-stage cell search procedure, comprising:
a chip matched filter, used for matching incoming signals;
a sampling device connected to the chip matched filter, used for over-sampling the incoming signals by N times against a chip rate;
a down-sample device connected to the sampling device, used for down-sampling the incoming signals and outputting N over-samples ($Y_1(k)$, $Y_2(k)$, $Y_N(k)$) N parallel signal paths;
an incoming signal selector connected to the down-sample device, used for choosing randomly one of the N over-samples; and to go through the succeeding stages;
a first stage detector connected to the incoming signal selector, used for achieving slot synchronization;
a second stage detector connected to the incoming signal selector, used for achieving frame boundary and code group synchronization;
a third stage detector connected to the incoming signal selector, used for achieving a scrambling code; and
an identification unit connected to the third stage detector, used for determining a trial succeed or not, wherein the identification unit further comprises:
a comparator connected to the third stage detector, used for testing the output of the third stage detector against a threshold $\eta_0$;
a first decision device connected to the comparator, used for determining the scrambling code;
wherein if the threshold is exceeded, then the selected scrambling code goes for a synchronization verification unit, otherwise the trial is considered to be failure, and a new trial will be restarted without penalty; and
the synchronization verification unit connected to the first decision device, used for verifying the scrambling code; and
a second decision device connected to the synchronization verification unit, used for determining the acceptance of the scrambling code;
wherein if the scrambling code passes the second decision device, then the trial succeeds, otherwise the a new trial will be restarted with a penalty time $T_P$ (ms) and;
an initial sampling point at the matched filter is assumed uniformly distributed.

16. A cell search apparatus as claimed in claim 15, wherein one of the N over-samples ($Y_1(k)$, $Y_2(k)$, $Y_N(k)$) is chosen randomly to go through a three-stage search processes in each trial.

17. A cell search apparatus as claimed in claim 15, wherein one of the N over-samples ($Y_1(k)$, $Y_2(k)$, $Y_N(k)$) is chosen randomly and independently to be proceeded in each stage of each trial.

18. A cell search apparatus as claimed in claim 15, wherein the first stage detector uses a generalized hierarchical Golay sequence as a primary synchronization code (PSC) in a primary synchronization channel (PSCH).

19. A cell search apparatus as claimed in claim 15, wherein the second stage detector uses 16 secondary synchronization codes (SSCs) orthogonal to the PSC in a secondary synchronization channel (SSCH).

20. A cell search apparatus as claimed in claim 19, wherein the SSCH is further encoded into a set of 64 code words by using a (15,3) comma-free Reed Solomon (CFRS) code, with each code word in the set representing a code group, to identify frame boundary/code group.

21. A cell search apparatus as claimed in claim 20, wherein the scrambling code can be determined by selecting one of the 8 codes by in a common pilot channel (CPICH) after the code group and frame boundary is identified.

22. A cell search apparatus as claimed in claim 15, wherein the first stage detector uses a non-coherent combined matched filter for slot synchronization in the first stage.

23. A cell search apparatus as claimed in claim 15, wherein the first stage detector selects more than one slot boundary candidate of a primary synchronization code (PSC) for the slot synchronization, although only one candidate will be considered.

24. A cell search apparatus as claimed in claim 19, wherein the second stage detector uses 16 matched filters for the detection of the secondary synchronization codes (SSCs).

25. A cell search apparatus as claimed in claim 20, wherein the code group and frame boundary use the code group and cyclic shift position associated with a maximum value of correlation values resulted from the code words in the second stage, respectively.

26. A cell search apparatus as claimed in claim 15, wherein the threshold $\eta_0$ is preset according to a constant false alarm rate.

27. A cell search apparatus as claimed in claim 15, wherein a cell search method is used for wideband code division multiple access, frequency division duplex system (W-CDMA/FDD).

28. A cell search apparatus as claimed in claim 15, wherein the cell search apparatus is used for the mobile equipment and wireless PDA system.

* * * * *